(12) United States Patent
Edamatsu et al.

(10) Patent No.: US 7,652,770 B2
(45) Date of Patent: Jan. 26, 2010

(54) OPTICAL NONLINER EVALUATION DEVICE AND OPTICAL SWITCHING ELEMENT

(75) Inventors: Keiichi Edamatsu, Natori (JP); Ryosuke Shimizu, Sendai (JP); Nobuyuki Matsuda, Kakuda (JP)

(73) Assignee: Japan Science and Technology Agency, Saitama (JP)

( * ) Notice: Subject to any disclaimer, the term of this patent is extended or adjusted under 35 U.S.C. 154(b) by 159 days.

(21) Appl. No.: 11/990,627

(22) PCT Filed: Dec. 6, 2006

(86) PCT No.: PCT/JP2006/324359

§ 371 (c)(1),
(2), (4) Date: Feb. 19, 2008

(87) PCT Pub. No.: WO2007/066686

PCT Pub. Date: Jun. 14, 2007

(65) Prior Publication Data

US 2009/0251703 A1 Oct. 8, 2009

(30) Foreign Application Priority Data

Dec. 7, 2005 (JP) .............................. 2005-353505

(51) Int. Cl.
*G01B 9/02* (2006.01)
*G01N 21/00* (2006.01)
*H04B 10/00* (2006.01)
(52) U.S. Cl. ................... 356/491; 356/73.1; 398/155
(58) Field of Classification Search .............. 356/73.1, 356/450, 491; 398/155
See application file for complete search history.

(56) References Cited

U.S. PATENT DOCUMENTS

| 5,301,008 A | * | 4/1994 | Huang et al. ................ 359/320 |
| 5,307,428 A | * | 4/1994 | Blow et al. .................... 385/11 |
| 5,377,284 A | | 12/1994 | Biilow |

FOREIGN PATENT DOCUMENTS

CA    2078994    9/1991

(Continued)

OTHER PUBLICATIONS

M.C. Gabriel, et al. "Measurement of Ultrafast Optical Nonlinearities Using a Modified Sagnac Interferometer" Optics Letters, vol. 16, No. 17, pp. 1334-1336, Sep. 1, 1991.

*Primary Examiner*—Hwa S Lee (Andrew)
(74) *Attorney, Agent, or Firm*—Harness, Dickey & Pierce, P.L.C.

(57) ABSTRACT

An optical nonlinear evaluation device (1) capable of accurately evaluating the optical nonlinearity of a Kerr medium in accordance with a phase difference caused by cross-phase modulation generated in the Kerr medium includes: a polarization Sagnac interference path (3) provided with a Kerr medium (4); an optical pulse light source (7) for supplying a signal beam (Dsig); a polarization beam splitter (PBS1) for splitting the signal beam (Dsig) into a signal beam (Hsig) and a signal beam (Vsig) polarized in a direction orthogonal to the signal beam (Hsig), for supplying the signal beam (Hsig) to a first side of the Kerr medium (4), and for supplying the signal beam (Vsig) to a second side of the Kerr medium (4); a glass plate (14) for entering, onto the signal beam (Hsig), a control beam (Vcont) for causing a change in phase difference between the signal beam (Hsig) and the signal beam (Vsig); separating means for separating the control beam (Vcont) from the signal beam (Hsig) having traveled through the Kerr medium (4); and a detection section (10) provided so as to detect the phase difference between the signal beam (Hsig) and the signal beam (Vsig).

9 Claims, 5 Drawing Sheets

FOREIGN PATENT DOCUMENTS

| | | |
|---|---|---|
| CA | 2109464 | 5/1994 |
| EP | 0 521 953 | 1/1993 |
| JP | 59-196414 | 11/1984 |
| JP | 06-202169 | 7/1994 |
| JP | 2004-163384 | 6/2004 |
| WO | WO 91/14963 | 10/1991 |

* cited by examiner

F I G. 6
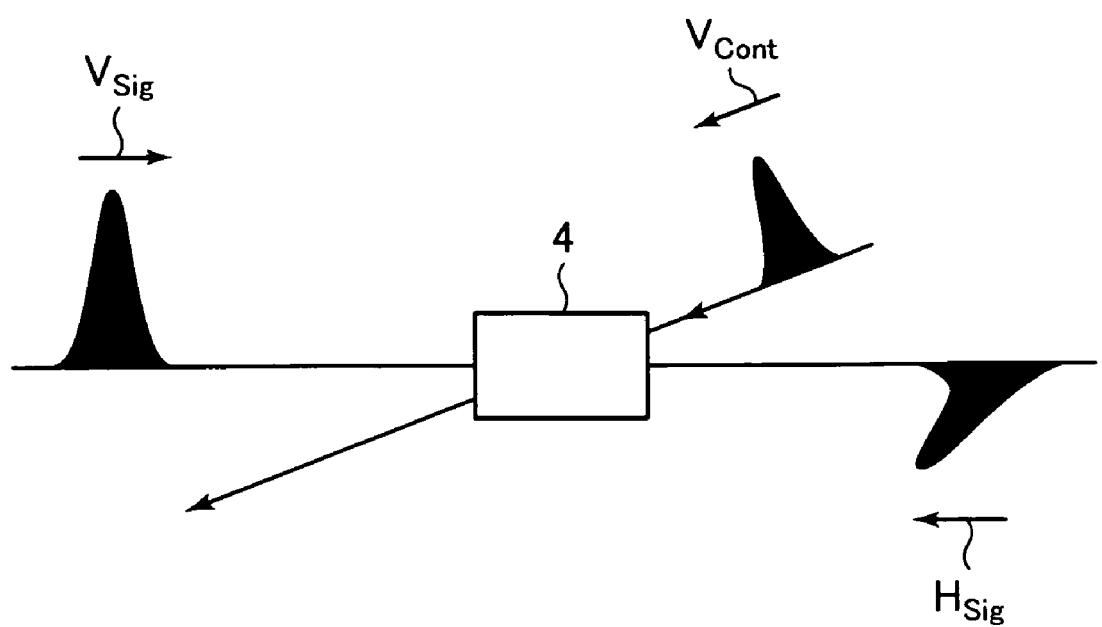

OPTICAL NONLINER EVALUATION DEVICE AND OPTICAL SWITCHING ELEMENT

TECHNICAL FIELD

The present invention relates to an optical nonlinear evaluation device and an optical switching element each of which uses a polarization Sagnac interferometer to detect, as polarization information, a phase shift caused by cross-phase modulation generated in a Kerr medium.

BACKGROUND ART

Conventionally, there have been used optical nonlinear evaluation devices (e.g., see Non-patent Document 1 and Patent Document 1) each of which uses a polarization Sagnac interferometer to detect, as polarization information, a phase shift caused by cross-phase modulation of a signal beam by irradiating, with a control beam, a Kerr medium that causes an optical nonlinear effect of causing a change in refractive index in accordance with light intensity.

According to the optical nonlinear evaluation device described in Non-patent Document 1, a waveguide Kerr medium such as an optical fiber is disposed on a polarization Sagnac interference path of a polarization Sagnac interferometer, and a signal beam supplied from a laser light source is split by a polarization beam splitter into a clockwise signal beam and a counterclockwise signal beam. The clockwise and counterclockwise signal beams split from each other travel along the polarization Sagnac interference path in directions opposite to each other, travel through the Kerr medium in directions opposite to each other, and then return to the polarization beam splitter. The light intensities of the signal beams traveling through the Kerr medium are differentiated from each other by an attenuator provided in the polarization Sagnac interferometer, and the phase difference thus caused between the signal beams is detected by a Babinet-Soleil compensator provided inside the polarization Sagnac interferometer and a polarizer provided outside the polarization Sagnac interferometer.

The Babinet-Soleil compensator is constituted by two wedge-shaped wave plates layered on top of each other. The phase of light traveling through the Babinet-Soleil compensator is changed by changing the way the two wedge-shaped wave plates are combined with each other. The Babinet-Soleil compensator can operate as a half-wave plate or a quarter-wave plate in accordance with the position in which the two wedge-shaped wave plates are combined with each other.

The optical nonlinear evaluation device described in Non-patent Document 1 yields an interference waveform of the signal beams by detecting the light intensities with a detector while changing the way the two wedge-shaped wave plates are combined with each other in the Babinet-Soleil compensator and then by sweeping the phases.

Further, Non-patent Document 1 proposes a measurement system obtained by replacing the polarization Sagnac interferometer with a normal Sagnac interferometer. In this measurement system, a beam splitter (BS) that splits light with a ratio of 1:1 independently of polarization is provided at an entrance of the normal Sagnac interferometer instead of the polarization beam splitter. Therefore, both the clockwise and counterclockwise signal beams in the Sagnac interferometer have the same polarization, and by causing a control beam whose polarization is orthogonal to the polarization of the signal beams to be incident, the control beam can be appropriately superimposed solely onto the clockwise signal beam.

When the control beam is not superimposed onto the clockwise signal beam, the effect of interference of light causes the signal beam incident on the normal Sagnac interferometer to be emitted to the same entrance port as it entered, and the signal beam is not emitted to the exit port. When the control beam is superimposed onto the signal beam by causing the control beam to be incident, the clockwise signal beam is subjected to cross-phase modulation. This causes a change in relative phase between the clockwise and counterclockwise signal beams, thereby causing a change in the amount of light that is to be emitted to the exit port. The phase shift can be measured by reading this change.

The optical nonlinear evaluation device described in Patent Document 1 measures the nonlinear characteristics of a Kerr medium by using signal beams. The nonlinear characteristics are caused by irradiating the Kerr medium with a control beam generated in a femtosecond region. The signal beams are generated by splitting a single optical pulse in a polarization Sagnac interferometer, and are polarized in directions orthogonal to each other. The polarization directions on a surface of the Kerr medium are aligned by a polarization direction converting mechanism including a half-wave plate that rotates the polarization directions of the signal beams 90 degrees in the polarization Sagnac interferometer. The phase difference between the signal beams outputted from the polarization Sagnac interferometer is swept by a phase difference sweeping mechanism including a quarter-wave plate and a polarizer. The nonlinear characteristics are found by measuring the intensity of light of interference between the signal beams for each phase difference that is to be swept.

[Patent Document 1]

Japanese Unexamined Patent Application Publication No. 163384/2004 (Tokukai 2004-163384; published on Jun. 10, 2004)

[Non-patent Document 1]

M. C. Gabriel, et al. "Measurement of ultrafast optical nonlinearities using a modified Sagnac interferometer", *Optics Letters*, Vol. 16, No. 17 (1991)

DISCLOSURE OF INVENTION

However, the optical nonlinear evaluation device described in Non-patent Document 1 is devised not as an optical switching element but as a device for measuring the nonlinearity of a Kerr medium, and detects a phase difference with a control beam superimposed on a signal beam. This causes such a problem that the optical nonlinear evaluation device described in Non-patent Document 1 causes a theoretical loss and cannot be used for high-speed switching for the purpose of quantum information processing.

Further, the above-described arrangement of the measurement system in which the normal Sagnac interferometer is used observes the phase difference between the clockwise and counterclockwise signal beams by converting the phase difference into light intensity. This causes a reduction in detection sensitivity in a small phase shift region.

Further, since the optical nonlinear evaluation device described in Patent Document 1 detects a polarization rotation angle with a polarizer, it performs detection depending on whether signal beams are transmitted or absorbed by the polarizer. From the viewpoint of switching, this causes such a problem that a polarization rotation caused by cross-phase modulation makes it impossible to spatially sort the signal beams into either output port of a polarization beam splitter without losing the signal beams.

The present invention has been made in view of the foregoing problems, and it is an object of the present invention to realize an optical nonlinear evaluation device capable of accurately evaluating the optical nonlinearity of a Kerr medium in accordance with a phase difference caused by cross-phase modulation generated in the Kerr medium.

It is another object of the present invention to realize an optical switching element that performs high-speed switching for the purpose of quantum information processing.

In order to solve the foregoing problems, an optical nonlinear evaluation device according to the present invention includes: a polarization Sagnac interference path provided with a Kerr medium that causes an optical nonlinear effect of causing a change in refractive index in accordance with light intensity; an optical pulse light source for supplying the polarization Sagnac interference path with a first signal beam polarized in a first direction; a first polarization beam splitter provided on the polarization Sagnac interference path so as to split the first signal beam into a second signal beam polarized in a second direction and a third signal beam polarized in a third direction orthogonal to the second direction, to supply the second beam to a first side of the Kerr medium, and to supply the third beam to a second side of the Kerr medium; superimposing means for coaxially superimposing, onto either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam; separating means for separating the control beam from either of the second and third signal beams having traveled through the Kerr medium; and detecting means provided so as to detect a phase difference between the second signal beam and the third signal beam.

The foregoing feature makes it possible to coaxially superimpose, onto either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam, thereby causing a phase difference between the second signal beam and the third signal beam by cross-phase modulation generated in the Kerr medium; to separate the control beam from either of the second and third signal beams having traveled through the Kerr medium; and to detect the phase difference caused between the second signal beam and the third signal beam by the cross-phase modulation. The optical nonlinear evaluation device according to the present invention coaxially superimposes, onto either of the second signal beam and the third signal beam, the control beam that differs in optical characteristic from either of the second signal beam and the third signal beam; separates the control beam from either of the second and third signal beams having traveled through the Kerr medium; and detects the phase difference caused between the second signal beam and the third signal beam by the cross-phase modulation. Therefore, the optical nonlinear evaluation device according to the present invention brings about an effect of being applied to a two-input and two-output optical switching element for high-speed switching for the purpose of quantum information processing that operates at a high speed by femtosecond pulses.

The optical nonlinear evaluation device according to the present invention is preferably arranged such that: the second signal beam and the control beam have different wavelengths; the superimposing means is a first dichroic mirror, disposed on the first side of the Kerr medium so as to superimpose the control beam onto the second signal beam, which transmits the second signal beam and reflects the control beam; and the separating means is a second dichroic mirror, disposed on the second side of the Kerr medium so as to separate the control beam from the second signal beam, which transmits the second signal beam and reflects the control beam.

According to the foregoing arrangement, the first and second dichroic mirrors transmit the second signal beam and reflect the control beam. The first and second dichroic mirrors that transmit the second signal beam and reflect the control beam can be constituted by mirrors that have a transmittance of 100% and a reflectance of 0% with respect to the wavelength of the second signal beam but have a reflectance of 100% and a transmittance of 0% with respect to the control beam. This makes it possible to minimize a theoretical loss that is to be caused when superimposing the control beam onto the second signal beam and a theoretical loss that is to be caused when separating the control beam from the second signal beam. Further, since the control beam is separated from the second signal beam, the optical nonlinear evaluation device according to the present invention can be applied to a lossless two-input and two-output optical switching element.

The optical nonlinear evaluation device according to the present invention is preferably arranged such that the control beam is polarized in a direction orthogonal to the direction in which the second signal beam is polarized, the optical nonlinear evaluation device further including: a first Faraday unit, disposed on the first side of the Kerr medium, which has a first Faraday rotator and a first half-wave plate; and a second Faraday unit, disposed on the second side of the Kerr medium, which has a second Faraday rotator and a second half-wave plate, the superimposing means being a third polarization beam splitter so disposed between the first Faraday unit and the Kerr medium as to superimpose the control beam onto the second signal beam, the separating means being a fourth polarization beam splitter so disposed between the second Faraday unit and the Kerr medium as to separate the control beam from the second signal beam.

According to the foregoing arrangement, an element nonreciprocal in terms of polarization can be constituted by the first Faraday unit, which has the first Faraday rotator and the first half-wave plate, and the second Faraday unit, which has the second Faraday rotator and the second half-wave plate. The vertically-polarized second signal beam having entered the first Faraday unit from the first side of the Kerr medium is rotated 90 degrees by the first Faraday unit so as to be converted into a horizontally-polarized signal beam, travels through the Kerr medium, and then is rotated 90 degrees by the second Faraday unit so as to be converted into a vertically-polarized signal beam. Meanwhile, the horizontally-polarized third signal beam having entered the second Faraday unit from the second side of the Kerr medium travels thorough the second Faraday unit, the Kerr medium, and the first Faraday unit as a horizontally-polarized beam. This makes it possible to cause the clockwise second signal beam and the counter-clockwise third signal beam to travel through the Kerr medium as identical horizontally-polarized beams. Therefore, when the control beam is a beam that differs by 90 degrees in polarization from the second signal beam, the control beam can be superimposed onto the second signal beam by the third polarization beam splitter provided between the first Faraday unit and the Kerr medium, can be made completely incident upon the Kerr medium, and can be completely extracted outwardly by the fourth polarization beam splitter after having traveled thorough the Kerr medium. This makes it possible to minimize a theoretical loss that is to be caused when superimposing the control beam onto the second signal beam and a theoretical loss that is to be caused when separating the control beam from the second signal beam. Further, since optical nonlinear evaluation device according to the present invention separates the control beam from the second signal beam, it can be applied to a lossless two-input and two-output optical switching element.

The optical nonlinear evaluation device according to the present invention is preferably arranged such that the control beam and the first signal beam have equal wavelengths.

According to the foregoing arrangement, the optical pulse light source serving as a light source of the first signal beam can be used as a light source of the control beam. This causes a single laser source to suffice.

The optical nonlinear evaluation device according to the present invention is preferably arranged such that: the superimposing means is a glass plate so disposed on the first side of the Kerr medium as to superimpose the control beam onto the second signal beam; and the separating mean is the first polarization beam splitter that separates the control beam from the second signal beam.

The foregoing arrangement makes it possible to use a simple structure to detect and evaluate a subtle phase difference based on optical nonlinearity caused by cross-phase modulation generated in the Kerr medium.

The optical nonlinear evaluation device according to the present invention is preferably arranged such that the Kerr medium is constituted by an optical fiber.

The foregoing arrangement makes it possible to use a simple structure to detect and evaluate a subtle phase difference based on optical nonlinearity caused by cross-phase modulation generated in the Kerr medium.

The optical nonlinear evaluation device according to the present invention is preferably arranged such that the first polarization beam splitter combines, into a fourth signal beam, the second and third signal beams having traveled through the Kerr medium; and the detecting means includes: a quarter-wave plate for converting the fourth signal into a linearly-polarized beam; a half-wave plate for rotating a polarization angle of the linearly-polarized beam; and a second polarization beam splitter for splitting the linearly-polarized beam, having traveled through the half-wave plate, into a fifth signal beam and a sixth signal beam in accordance with the polarization angle of the linearly-polarized beam.

The foregoing arrangement makes it possible to highly precisely detect the rotation angle of the linearly-polarized beam by measuring a change in difference between voltages respectively based on the fifth and sixth signal beams split from each other by the second polarization beam splitter and to highly precisely detect and evaluate a subtle phase difference based on optical nonlinearity caused by cross-phase modulation generated in the Kerr medium.

The optical nonlinear evaluation device according to the present invention is preferably arranged such that the first direction is a plus-45-degree direction.

According to the foregoing arrangement, the intensity ratio of (i) the second signal beam traveling from the polarization beam splitter to the first side of the Kerr medium to (ii) the third signal beam traveling from the polarization beam splitter to the second side of the Kerr medium can be 1:1. The beam into which the second signal beam and the third signal beam are combined becomes linearly polarized. The phase shift amount can be easily analyzed. Further, the relationship between the phase difference Φ caused by cross-phase modulation generated in the Kerr medium and the polarization rotation angle θ can be represented by a simple relational expression "Φ=2θ".

In order to solve the foregoing problems, an optical switching element according to the present invention includes: a polarization Sagnac interference path provided with a Kerr medium that causes an optical nonlinear effect of causing a change in refractive index in accordance with light intensity; a first optical pulse light source for supplying the polarization Sagnac interference path with a first signal beam polarized in a first direction; a first polarization beam splitter provided on the polarization Sagnac interference path so as to split the first signal beam into a second signal beam polarized in a second direction and a third signal beam polarized in a third direction orthogonal to the second direction, to supply the second beam to a first side of the Kerr medium, and to supply the third beam to a second side of the Kerr medium; a second optical pulse light source for supplying, to either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam, so as to cause a 180-degree phase difference between the second signal beam and the third signal beam by cross-phase modulation generated in the Kerr medium; superimposing means for coaxially superimposing, onto either of the second signal beam and the third signal beam, the control beam supplied from the second optical pulse light source; separating means for separating the control beam from either of the second and third signal beams having traveled through the Kerr medium; and control means for controlling whether or not the control beam is supplied from the second optical pulse light source, the first polarization beam splitter combining, into a fourth signal beam, the second and third signal beams having traveled through the Kerr medium, the optical switching element further including: a quarter-wave plate for converting the fourth signal into a linearly-polarized beam; a half-wave plate for rotating a polarization angle of the linearly-polarized beam; and a second polarization beam splitter for emitting the linearly-polarized beam, having traveled through the half-wave plate, to different ports in accordance with whether or not the control means allows the control beam to be supplied.

According to the foregoing feature, the optical switching element includes: a second optical pulse light source for supplying, to either of the second signal beam traveling from the first polarization beam splitter to the first side of the Kerr medium and the third signal beam traveling from the first polarization beam splitter to the second side of the Kerr medium, a control beam for causing a 180-degree phase difference between the second signal beam and the third signal beam by cross-phase modulation generated in the Kerr medium; superimposing means for coaxially superimposing, onto either of the second signal beam and the third signal beam, the control beam supplied from the second optical pulse light source; separating means for separating the control beam from either of the second and third signal beams having traveled through the Kerr medium; and control means for controlling whether or not the control beam is supplied from the second optical pulse light source. The first polarization beam splitter combines, into a fourth signal beam, the second and third signal beams having traveled through the Kerr medium. The optical switching element further includes: a quarter-wave plate for converting the fourth signal into a linearly-polarized beam; a half-wave plate for rotating a polarization angle of the linearly-polarized beam; and a second polarization beam splitter for emitting the linearly-polarized beam, having traveled through the half-wave plate, to different ports in accordance with whether or not the control means allows the control beam to be supplied. Therefore, the control beam is separated from either of the second and third signal beams having traveled through the Kerr medium, the linearly-polarized beam emitted to different ports in accordance with whether or not the control means allows the control beam to be supplied. This makes it possible to provide a two-input and two-output optical switching element for use in high-speed switching for the purpose of quantum information processing that operates at a high speed by femtosecond pulses.

As described above, the optical nonlinear evaluation device according to the present invention includes: superimposing means for coaxially superimposing, onto either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam; separating means for separating the control beam from either of the second and third signal beams having traveled through the Kerr medium; and detecting means provided so as to detect a phase difference between the second signal beam and the third signal beam.

This makes it possible to coaxially superimpose, onto either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam, thereby causing a phase difference between the second signal beam and the third signal beam by cross-phase modulation generated in the Kerr medium; to separate the control beam from either of the second and third signal beams having traveled through the Kerr medium; and to detect the phase difference caused between the second signal beam and the third signal beam by the cross-phase modulation. The optical nonlinear evaluation device according to the present invention coaxially superimposes, onto either of the second signal beam and the third signal beam, the control beam that differs in optical characteristic from either of the second signal beam and the third signal beam; separates the control beam from either of the second and third signal beams having traveled through the Kerr medium; and detects the phase difference caused between the second signal beam and the third signal beam by the cross-phase modulation. Therefore, the optical nonlinear evaluation device according to the present invention brings about an effect of being applied to a two-input and two-output optical switching element for high-speed switching for the purpose of quantum information processing that operates at a high speed by femtosecond pulses.

As described above, the optical switching element according to the present invention includes: a second optical pulse light source for supplying, to either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam, so as to cause a 180-degree phase difference between the second signal beam and the third signal beam by cross-phase modulation generated in the Kerr medium; superimposing means for coaxially superimposing, onto either of the second signal beam and the third signal beam, the control beam supplied from the second optical pulse light source; separating means for separating the control beam from either of the second and third signal beams having traveled through the Kerr medium; and the control means for controlling whether or not the control beam is supplied from the second optical pulse light source. The first polarization beam splitter combines, into a fourth signal beam, the second and third signal beams having traveled through the Kerr medium. The optical switching element further includes: a quarter-wave plate for converting the fourth signal into a linearly-polarized beam; a half-wave plate for rotating a polarization angle of the linearly-polarized beam; and a second polarization beam splitter for emitting the linearly-polarized beam, having traveled through the half-wave plate, to different ports in accordance with whether or not the control means allows the control beam to be supplied.

Therefore, the control beam is separated from either of the second and third signal beams having traveled through the Kerr medium, the linearly-polarized beam emitted to different ports in accordance with whether or not the control means allows the control beam to be supplied. This makes it possible to provide a two-input and two-output optical switching element for use in high-speed switching for the purpose of quantum information processing that operates at a high speed by femtosecond pulses.

BRIEF DESCRIPTION OF DRAWINGS

FIG. 6 is a block diagram showing an arrangement of a main part of an optical nonlinear evaluation device according to Embodiment 4.

REFERENCE NUMERALS

1 Optical nonlinear evaluation device
2 Polarization Sagnac interferometer
3 Polarization Sagnac interference optical path
4 Kerr medium
5, 6 Side
7 Optical pulse light source (first optical pulse light source)
8 Optical pulse light source (second optical pulse light source)
9 Control circuit (control means)
10 Detection section (detecting means)
11 Signal beam (fourth signal beam)
12 Signal beam (fifth signal beam)
13 Signal beam (sixth signal beam)
14 Glass plate
PBS1 Polarization beam splitter (first polarization beam splitter)
PBS2 Polarization beam splitter (second polarization beam splitter)

PBS3 Polarization beam splitter (third polarization beam splitter)
PBS4 Polarization beam splitter (fourth polarization beam splitter)
DM1 Dichroic mirror (superimposing means)
DM2 Dichroic mirror (separating means)
Dsig Signal beam (first signal beam)
Hsig Signal beam (second signal beam)
Vsig Signal beam (third signal beam)
Vcont Control beam
FU1, FU2 Faraday unit
FR1, FR2 Faraday rotator
HWP1, HWP2 Half-wave plate
QWP Quarter-wave plate
HWP3 Half-wave plate

BEST MODE FOR CARRYING OUT THE INVENTION

Embodiments of the present invention will be described below with reference to FIGS. 1 through 6.

EMBODIMENT 1

Figure 1:
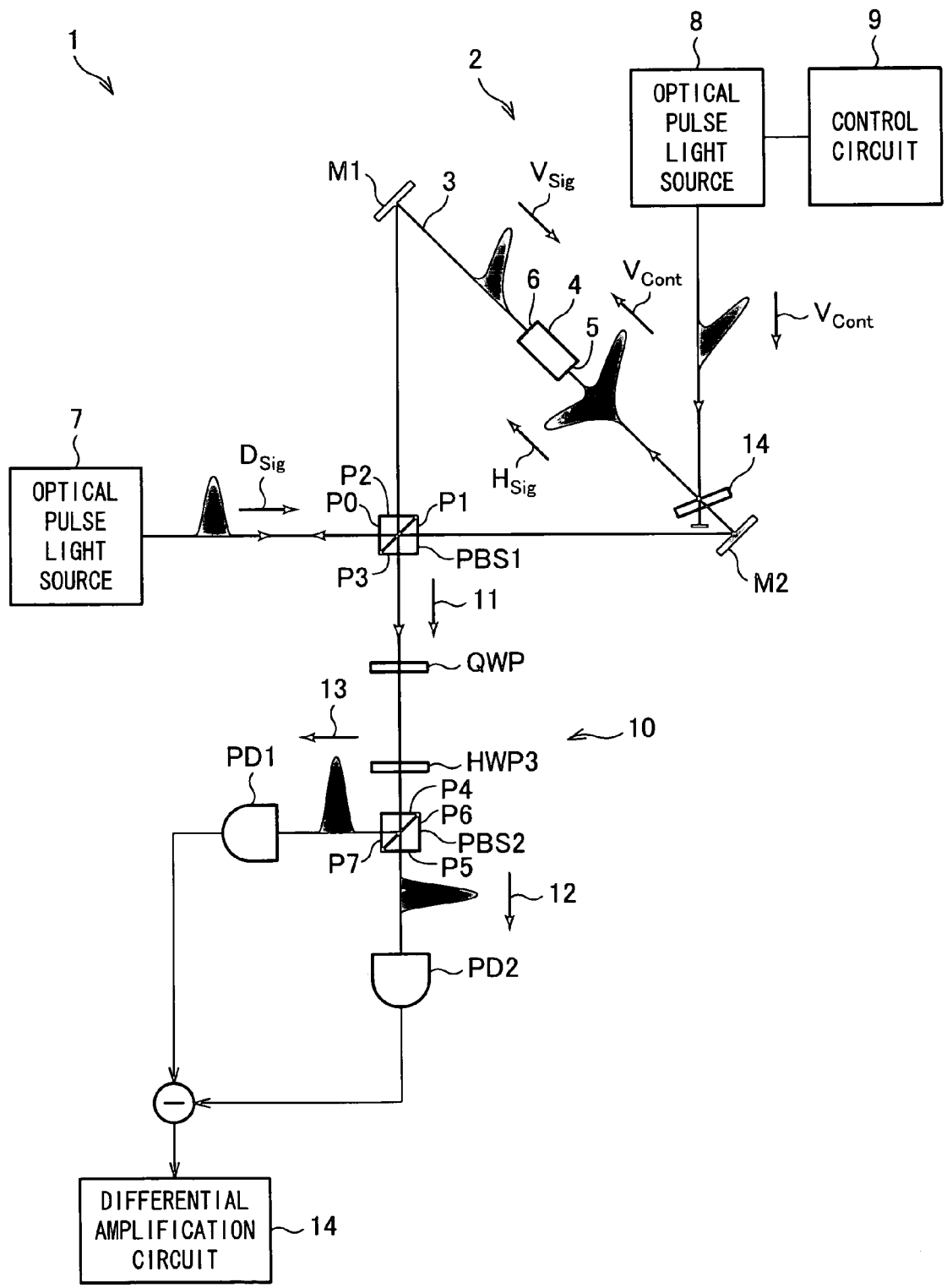
FIG. 1 is a block diagram showing an arrangement of an optical nonlinear evaluation device according to Embodiment 1.

FIG. 1 is a block diagram showing an arrangement of an optical nonlinear evaluation device 1 according to Embodiment 1. The optical nonlinear evaluation device 1 includes a polarization Sagnac interferometer 2. The polarization Sagnac interferometer 2 is provided with a polarization beam splitter PBS1. The polarization beam splitter PBS1 has ports P0, P1, P2, and P3. The ports P0 and P1 are formed so as to be opposite each other, and the ports P2 and P3 are formed so as to be opposite each other.

The polarization Sagnac interferometer 2 has a mirror M1 and a mirror M2. The mirror M1 is disposed so as to face the port P2, and the mirror M2 is disposed so as to face the port P1. The polarization beam splitter PBS1 and the mirrors M1 and M2 form a triangular polarization Sagnac interference optical path 3.

Disposed in the middle of the space between the mirror M1 and M2 is a Kerr medium 4 that causes an optical nonlinear effect of causing a change in refractive index in accordance with light intensity. The Kerr medium 4 is constituted, for example, by a photonic crystal fiber. The Kerr medium 4 has a side 5 and a side 6. The side 5 is formed so as to face the mirror M2, and the side 6 is formed so as to face the mirror M1.

The optical nonlinear evaluation device 1 includes an optical pulse light source 7. The optical pulse light source 7 emits a signal beam Dsig to the port P0 of the polarization beam splitter PBS1. The signal beam Dsig is polarized in a plus-45-degree direction. The polarization beam splitter PBS1 splits the signal beam Dsig into a signal beam Hsig and a signal beam Vsig. The signal beam Hsig is polarized in a 0-degree direction, and the signal beam Vsig is polarized in a 90-degree direction. The signal beam Hsig is emitted from the port P1 to the mirror M2 after having been completely transmitted. The signal beam Vsig is emitted from the port P2 to the mirror M1 after having been completely reflected.

As indicated by the polarization vector of Mathematical Formula 1 below, the signal beam Dsig polarized in a plus-45-degree direction can be seen as a beam into which the signal beam Hsig polarized in a 0-degree direction and the signal beam Vsig polarized in a 0-degree direction are combined at the same intensity with a phase difference of 0.

$$D = 1/\sqrt{2}(H+V)$$ [Mathematical Formula 1]

Thus, the plus-45-degree-polarized signal beam Dsig is split into the 0-degree-polarized signal beam Hsig and the 90-degree-polarized signal beam Vsig with an intensity ratio of 1:1.

The signal beam Vsig, emitted from the port P2, is reflected by the mirror M1 toward the side 6 of the Kerr medium 4. The signal beam Hsig, emitted from the port P1, is reflected by the mirror M2 toward the side 5 of the Kerr medium 4.

The optical nonlinear evaluation device 1 includes an optical pulse light source 8. The optical pulse light source 8 emits a pulse-like control beam Vcont polarized in a 90-degree direction.

The polarization Sagnac interferometer 2 has a glass plate 14 provided between the Kerr medium 4 and the mirror M2. The glass plate 14 reflects the control beam Vcont emitted from the optical pulse light source 8; coaxially superimposes the control beam Vcont onto the signal beam Hsig, which travels through the glass plate 14, in terms of time and space; and then supplies, to the side 5 of the Kerr medium 4, the signal beam Hsig onto which the control beam Vcont has been coaxially superimposed. The signal beam Hsig onto which the control beam Vcont has been coaxially superimposed is transmitted by the Kerr medium 4, emitted from the side 6 to the mirror M1, reflected by the mirror M1, and then made incident on the port P2 of the polarization beam splitter PBS1.

The signal beam Vsig is incident on the side 6 of the Kerr medium 4, transmitted by the Kerr medium 4, emitted from the side 5, transmitted by the glass plate 14, reflected by the mirror M2, and then made incident on the port P1 of the polarization beam splitter PBS1.

The glass plate 14 transmits not less than 90% of the signal beam Hsig and reflects approximately 10% of the signal beam Hsig. Therefore, the glass plate 14 causes only a small loss of the signal beam Hsig. Further, the glass plate 14 reflects approximately 10% of the control beam Vcont. Therefore, the glass plate 14 can cause not less than 90% of the signal beam Hsig to be incident on the Kerr medium 4. Thus, the glass plate 14 causes only a small loss of the signal beam Hsig.

The optical linear evaluation device 1 is provided with a control circuit 9. The control circuit 9 controls whether or not the optical pulse light source 8 supplies the control beam Vcont, and controls the intensity of the control beam Vcont. Although the efficiency with which the control beam Vcont is incident on the polarization Sagnac interferometer 2 is low, such low efficiency can be compensated for by increasing the intensity of the control beam Vcont by the control circuit 9.

Thus, the signal beam Hsig and the signal beam Vsig pass through the same polarization Sagnac interference optical path 3 in directions opposite to each other, and enter the identical polarization beam splitter PBS 1 from the ports P2 and P1 opposite to the ports P1 and P2 from which the signal beam Hsig and the signal beam Vsig were emitted, respectively.

The signal beams Hsig and Vsig are combined into a signal beam 11 by the polarization beam splitter PBS1, and all the beams are emitted from the port P3. That is, the 0-degree-polarized signal beam Hsig exits from the port P3 after having been transmitted by the polarization beam splitter PBS1, and the 90-degree-polarized signal beam Vsig exits from the port P3 after having been completely reflected by the polarization beam splitter PBS1. Since the control beam Vcont superimposed onto the signal beam Hsig is a beam polarized in a 90-degree direction, the control beam Vcont exits from the port P0 after having been completely reflected by the polarization beam splitter PBS1. Therefore, the control beam Vcont does not affect the signal beam 11 exiting the polarization Sagnac interferometer 2 from the port P3.

Thus, in the polarization Sagnac interferometer 2, the two signal beams Hsig and Vsig split from each other pass through the identical optical path. Therefore, under such conditions that the control circuit 9 stops the control beam Vcont from being incident, the signal beams Hsig and Vsig are affected by the same disturbance, so that there is no change in phase difference between the two signal beams Hsig and Vsig. Therefore, as indicated by the polarization vector of Mathematical Formula 2 below, the signal beam 11 exiting from the port P3 is a beam polarized in a 45-degree direction as with the signal beam Dsig.

$(1/\sqrt{2}(H_{sig}+V_{sig})=D_{sig})$ [Mathematical Formula 2]

On the other hand, when the control circuit 9 allows the control beam Vcont to be incident, cross-phase modulation is generated in the Kerr medium 4 since the Kerr medium 4 causes a change in refractive index in accordance with light intensity. The cross-phase modulation causes a change in phase difference between the signal beams Hsig and Vsig. Therefore, as indicated by the polarization vector of Mathematical Formula 3 below, the signal beam 11 exiting from the port P3 is polarized differently from the signal beam Dsig incident on the polarization beam splitter PBS1.

$1/\sqrt{2}(H_{Sig}+e^{i\phi}V_{Sig})$ [Mathematical Formula 3]

The phase difference is caused by the cross-phase modulation generated in the Kerr medium 4. The size of the cross-phase modulation varies depending not on the time mean but on the instantaneous intensity of light, i.e., on the peak value of pulsed light. For this reason, the phase difference is adjusted by changing the instantaneous intensity of the control beam Vcont by the control circuit 9. Further, the phase difference also varies depending on the length by which the signal beam Hsig and the control beam Vcont interact with each other. In cases where the Kerr medium 4 is constituted by an optical fiber, examples of the length by which the signal beam Hsig and the control beam Vcont interact with each other include the length of the optical fiber.

The signal beam 11, having exited from the port P3 of the polarization beam splitter PBS1, passes through a quarter-wave plate QWP. As indicated by the polarization vector of Mathematical Formula 4 below, the polarization state of the signal beam 11 having passed through the quarter-wave plate QWP can be expressed by superimposing a right-hand (R) circularly-polarized beam and a left-hand (L) circularly-polarized beam onto each other.

$1/\sqrt{2}(R_{Sig}+e^{i\phi}L_{Sig})$ [Mathematical Formula 4]

Obtained by superimposing the right-hand (R) circularly-polarized beam and the left-hand (L) circularly-polarized beam onto each other at the identical intensities is a linearly-polarized beam whose angle varies depending on the phase difference therebetween. That is, the phase difference caused when the control beam Vcont enters the polarization Sagnac interferometer 2 from the outside is expressed as the rotation angle of the linearly-polarized beam.

The signal beam 11, having passed through the quarter-wave plate QWP, passes through a half-wave plate HWP3. The half-wave plate HWP3 rotates the angle of linear polarization of the signal beam 11.

Provided on a side of the half-wave plate HWP3 opposite to the quarter-wave plate QWP is a polarization beam splitter PBS2. The polarization beam splitter PBS2 has ports P4, P5, P6, and P7. The ports P4 and P5 are formed so as to be opposite each other, and the ports P6 and P7 are formed so as to be opposite each other.

The signal beam 11, having passed through the half-wave plate HWP3, enters the port P4 of the polarization beam splitter PBS2. The polarization beam splitter PBS2 splits the signal beam 11 into a signal beam 12 and a signal beam 13. The signal beam 12 exits from the port P5, and the signal beam 13 exits from the port P7. The signal beams 12 and 13 are split from each other with a light intensity ratio that varies depending on the angle of linear polarization of the signal beam 11.

Thus, according to Embodiment 1, the angle of polarization of the signal beam 11 outputted from the polarization beam splitter PBS1 is rotated in accordance with the phase difference caused by the cross-phase modulation. Therefore, the light intensity ratio with which the signal beams 12 and 13 are split from each other by the polarization beam splitter 2 with the half-wave plate HWP3 set at an identical angle varies depending on the phase difference caused by the cross-phase modulation. By detecting a change in the light intensity ratio with which the signal beams 12 and 13 are split from each other, the angle of linear polarization based on the phase difference caused by the cross-phase modulation can be found. Moreover, the phase difference caused by the cross-phase modulation can be calculated in accordance with the angle of linear polarization thus found.

The signal beam 13, having exited from the port P7 of the polarization beam splitter PBS2, is converted into a voltage signal by a photodiode PD1; and the signal beam 12, having exited from the port P5, is converted into a voltage signal by a photodiode PD2. A differential signal between the voltage signal from the photodiode PD1 and the voltage signal from the photodiode PD2 is amplified by a differential amplification circuit 14.

In cases where no control beam Vcont is incident, the angle of the half-wave plate HWP3 is adjusted so that the signal beams 12 and 13 are split from each other by the polarization beam splitter PBS2 so as to have equal intensities. Such an adjustment of the angle of the half-wave plate HWP3 zeros the difference between the voltage signal outputted from the photodiode. PD1 and the voltage signal outputted from the photodiode PD2.

On the other hand, when the control beam Vcont is incident, the angle of linear polarization of the signal beam 11 is rotated, so that the ratio with which the beam is split by the polarization beam splitter PBS2 is changed. This causes a change in difference between the voltage signals respectively outputted from the photodiodes PD1 and PD2. Detection of this change in difference between the voltage signals makes it possible to highly precisely detect the rotation of the angle of linear polarization of the signal beam 11. That is, it is possible to highly precisely detect a subtle phase difference caused by the cross-phase modulation generated in the Kerr medium.

The quarter-wave plate QWP, the half-wave plate HWP3, the polarization beam splitter PBS2, the photodiode PD1, the photodiode PD2, and the differential amplification circuit 14 constitute a detection section 10.

Such a structure constituted by the half-wave plate HWP3 and the polarization beam splitter PBS2 makes it possible to detect respective outputs of the two ports P0 and P3 by differential amplification. This makes it possible to improve measurement accuracy.

When the instantaneous intensity of the control beam Vcont supplied from the optical pulse light source 8 is adjusted so that the phase difference becomes 180 degrees, the outgoing signal beam 11 becomes a beam polarized in a minus-45-degree direction as represented by the polarization vector of Mathematical Formula 5 below.

$$(\overline{D}_{Sig})$$ [Mathematical Formula 5]

That is, the outgoing signal beam 11 becomes a beam that differs by 90 degrees in polarization angle from the signal beam Dsig polarized in a plus-45-degree direction in the absence of a control beam.

Assume that the angle of the half-wave plate HWP3 is determined so that the signal beam 11 is polarized as indicated by the polarization vector of Mathematical Formula (6) below.

$$D_{Sig} \rightarrow H_{Sig}, \overline{D}_{Sig} \rightarrow V_{Sig}$$ [Mathematical Formula 6]

Then, when the control beam Vcont is turned on, the signal beam 11 exits from the port P7 after having been completely reflected by the polarization beam splitter PBS2. Alternatively, when the control beam Vcont is turned off, the signal beam 11 exits from the port P5 after having been completely transmitted by the polarization beam splitter PBS2. Thus, it is possible to control, depending on whether the control beam Vcont is on or off, whether the signal beam 11 exits the polarization beam splitter PBS2 from the port P5 or the port P7. Therefore, it is possible to apply the optical nonlinear evaluation device 1 to an optical switching element.

Whereas the aforementioned arrangement of Patent Document 1 detects the rotation angle of polarization by a polarizer, the arrangement of Embodiment 1 differs from the arrangement of Patent Document 1 in that: the arrangement of Embodiment 1 is provided with the half-wave plate HWP3 and the polarization beam splitter PBS2, and detects a polarization rotation angle by sweeping the angle of the half-wave plate HWP3. This arrangement causes the signal beam 11 to be sorted to either the port P5 or the port P7 of the polarization beam splitter PBS2 without a loss in accordance with the polarization rotation angle of the signal beam 11. Therefore, it is possible to use the optical nonlinear evaluation device 1 for high-speed switching for the purpose of quantum information processing.

Further, Embodiment 1 makes it possible to obtain an optical nonlinear evaluation device 1 that can accurately evaluate optical nonlinearity caused by cross-phase modulation, although it neither has a phase difference of 180 degrees nor functions as an optical switching element.

In such a system of an optical nonlinear evaluation device 1, it is important that the control beam Vcont differ in optical characteristic (mode) from the signal beam Hsig that is coaxially superimposed onto the control beam Vcont. In Embodiment 1, the control beam Vcont and the signal beam Hsig may be polarized in different directions and may have identical wavelengths. In this case, the two optical pulse light sources 7 and 8 may be replaced by a single optical pulse light source. In cases where the control beam Vcont and the signal beam Hsig have different wavelengths as will be described later in Embodiment 2, the control beam Vcont and the signal beam Hsig may be polarized in identical directions.

Figure 2:
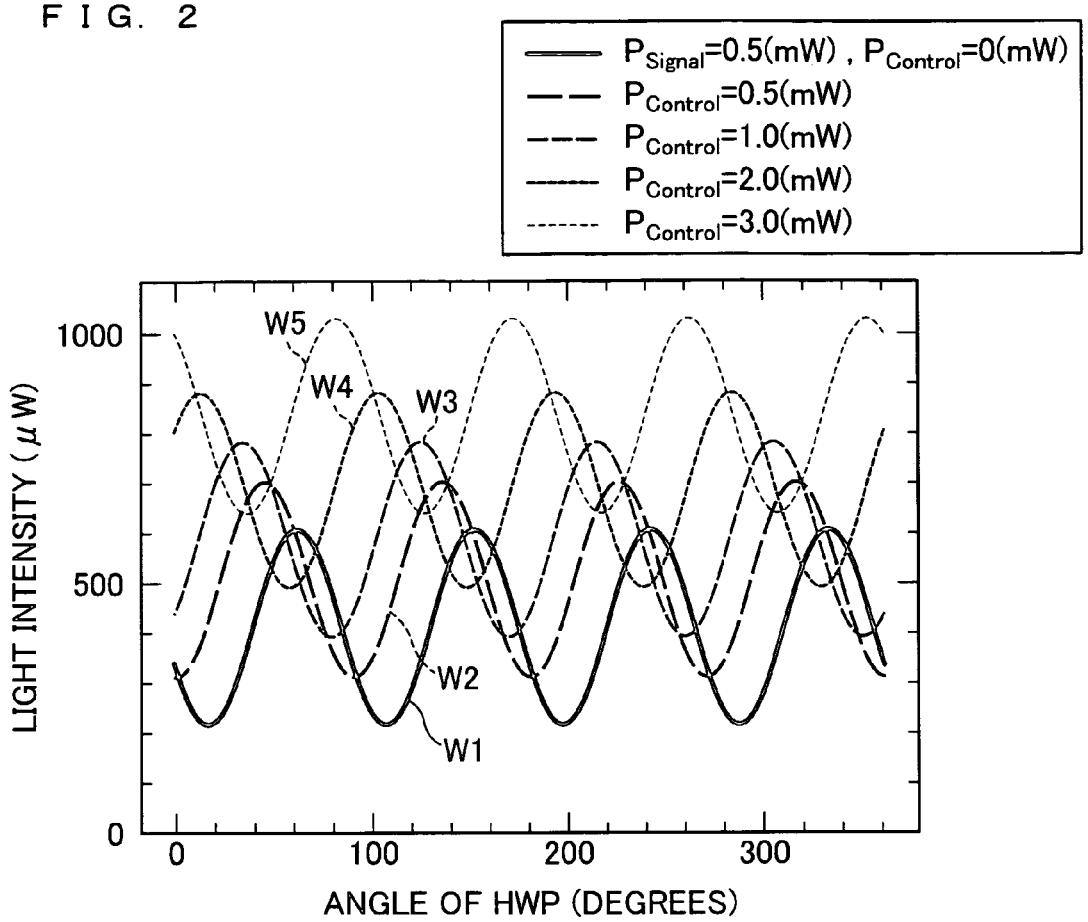
FIG. 2 is a graph showing the relationship between the angle of a half-wave plate and the light intensity of an output signal outputted in the optical nonlinear evaluation device according to Embodiment 1.

FIG. 2 is a graph showing the relationship between the angle of the half-wave plate HWP3 and the light intensity of an output signal outputted from the polarization beam splitter PBS2 in the optical nonlinear evaluation device 1. The horizontal axis represents the angle of the polarization beam splitter PBS2, and the vertical axis represents the light intensity of an output signal outputted from one port of the polarization beam splitter PBS2. The light intensity of an output signal from one port of the polarization beam splitter PBS2 was measured while rotating the angle of the half-wave plate HWP3. In reality, the light intensity of the output signal was measured while changing the intensity of the incoming control beam Vcont.

The curve W1 represents the relationship between the angle of the half-wave plate HWP3 and the light intensity of an output signal outputted from the polarization beam splitter PBS2 when the control beam Vcont was turned off so as not to be incident. The curve W2 represents the relationship between the angle of the half-wave plate HWP3 and the light intensity of an output signal outputted from the polarization beam splitter PBS2 when the control beam Vcont was made incident and the intensity of the incoming control beam Vcont was set to 0.5 mW. The curve W3 represents the relationship between the angle of the half-wave plate HWP3 and the light intensity of an output signal outputted when the intensity of the control beam Vcont was set to 1.0 mW. The curve W4 represents the relationship formed when the intensity of the control beam Vcont was set to 2.0 mW. The curve W5 represents the relationship formed when the intensity was set to 3.0 mW.

A comparison among these curves W1, W2, W3, W4, and W5 shows that as the intensity of the control beam Vcont is increased, the curves shift from one another to the left as presented on paper. This means that a change in the intensity of the control beam Vcont causes the polarization of the signal beam to be rotated.

Figure 3:
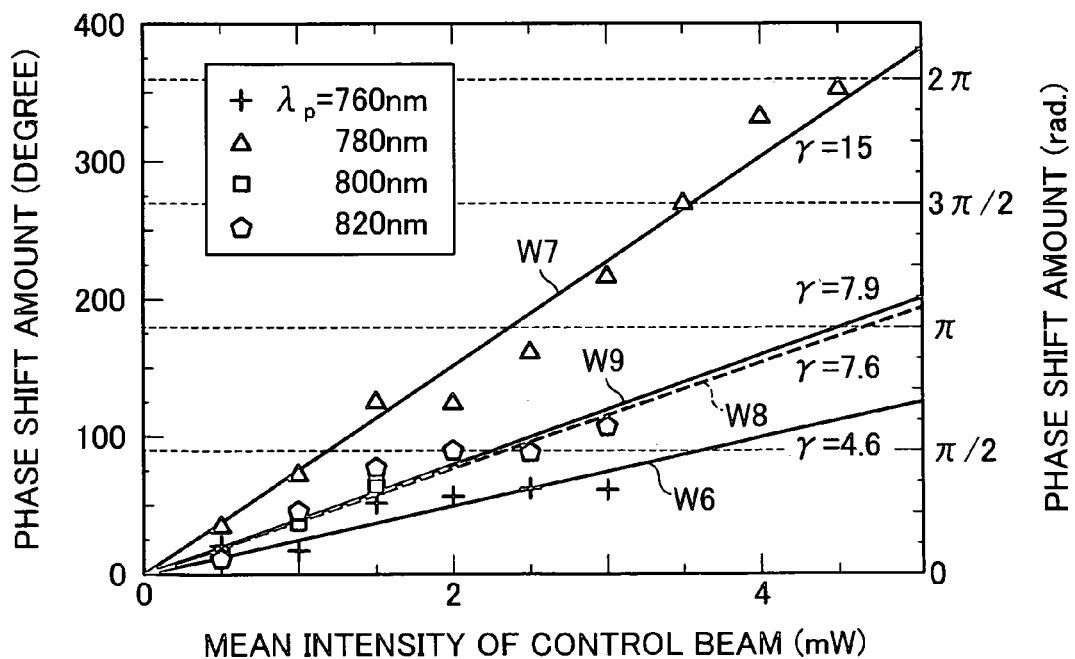
FIG. 3 is a graph showing the relationship between the mean intensity of a control beam and the phase shift amount in the optical nonlinear evaluation device according to Embodiment 1.

FIG. 3 is a graph showing the relationship between the mean intensity of the control beam Vcont and the phase shift amount in the optical nonlinear evaluation device 1. The horizontal axis represents the mean intensity of the control beam Vcont, and the vertical axis represents the phase shift amount. The phase shift amount found in accordance with the rotation angle of polarization was plotted as a function of the mean intensity of the control beam Vcont. The straight line W6 represents the relationship between the mean intensity of the control beam Vcont and the phase shift amount, which relationship is formed when the laser wavelength is 760 nm. The curve W7 represents the relationship between the mean intensity of the control beam Vcont and the phase shift amount, which relationship is formed when the laser wavelength is 780 nm. The curve W8 represents the relationship between the mean intensity of the control beam Vcont and the phase shift amount, which relationship is formed when the laser wavelength is 800 nm. The curve W9 represents the relationship between the mean intensity of the control beam Vcont and the phase shift amount, which relationship is formed when the laser wavelength is 820 nm.

As shown in FIG. 3, a phase shift of 180 degrees necessary for switching is actually obtained when the laser used has a wavelength of 780 nm and the control beam Vcont has a mean intensity of approximately 2 mW.

Although Embodiment 1 thus described shows an example where the control beam Vcont is superimposed onto the signal beam Hsig, the present invention is not limited to this. Of course, the control beam Vcont may be superimposed onto the signal beam Vsig. The same applies to Embodiments 2, 3, and 4 to be described below.

Further, although Embodiment 1 shows an example where the signal beam Dsig is polarized in a plus-45-degree direction, the present invention is not limited to this. The signal beam Dsig may be polarized in a direction other than a plus-45-degree direction. However, it is preferable, for the reasons given below, that the signal beam Dsig is polarized in a plus-45-degree direction. That is, when the signal beam Dsig is polarized in a plus-45-degree direction, the intensity ratio of the signal beam Hsig to the signal beam Vsig is 1:1, so that the signal beam 11 having exited the polarization Sagnac interferometer 2 and having passed through the quarter-wave plate QWP becomes a linearly-polarized beam. This makes it possible to easily analyze the phase shift amount. Further, when the signal beam Dsig is polarized in a plus-45-degree direction, the relationship between the phase difference $\Phi$ caused by cross-phase modulation and the polarization rotation angle $\theta$ is represented by a simple relational expression "$\Phi=2\theta$". The same applies to Embodiments 2, 3, and 4 to be described below.

Further, although Embodiment 1 shows an example where the Kerr medium 4 is disposed in the middle of the space between the mirrors M1 and M2, the present invention is not limited to this. In cases where the control beam Vcont is coaxially superimposed onto the signal beam Hsig and the Kerr medium 4 is constituted by a long member, such as an optical fiber, which has a long interaction length, a period of time during which the control beam Vcont and the signal beam Hsig coaxially superimposed thereon propagate while causing cross-phase modulation becomes sufficiently longer than a period of time during which the clockwise signal beam Vsig and the counterclockwise signal beam Hsig are superimposed on each other. For this reason, such an effect that there is no phase difference because the cross-phase modulation generated by the control beam Vcont at a point where the signal beam Vsig and the signal beam Hsig are superimposed onto each other affects the clockwise and counterclockwise signal beams Vsig and Hsig becomes relatively small, and therefore can be ignored. Therefore, the Kerr medium 4 is not limited in terms of its location.

Further, although Embodiment 1 shows an example where the mirrors M1 and M2 are disposed, the present invention is not limited to this. The mirrors M1 and M2 may be replaced by means, such an optical fiber, which guides light from the polarization beam splitter PBS1 to the Kerr medium 4 or from the Kerr medium 4 to the polarization beam splitter PBS1.

EMBODIMENT 2

Figure 4:
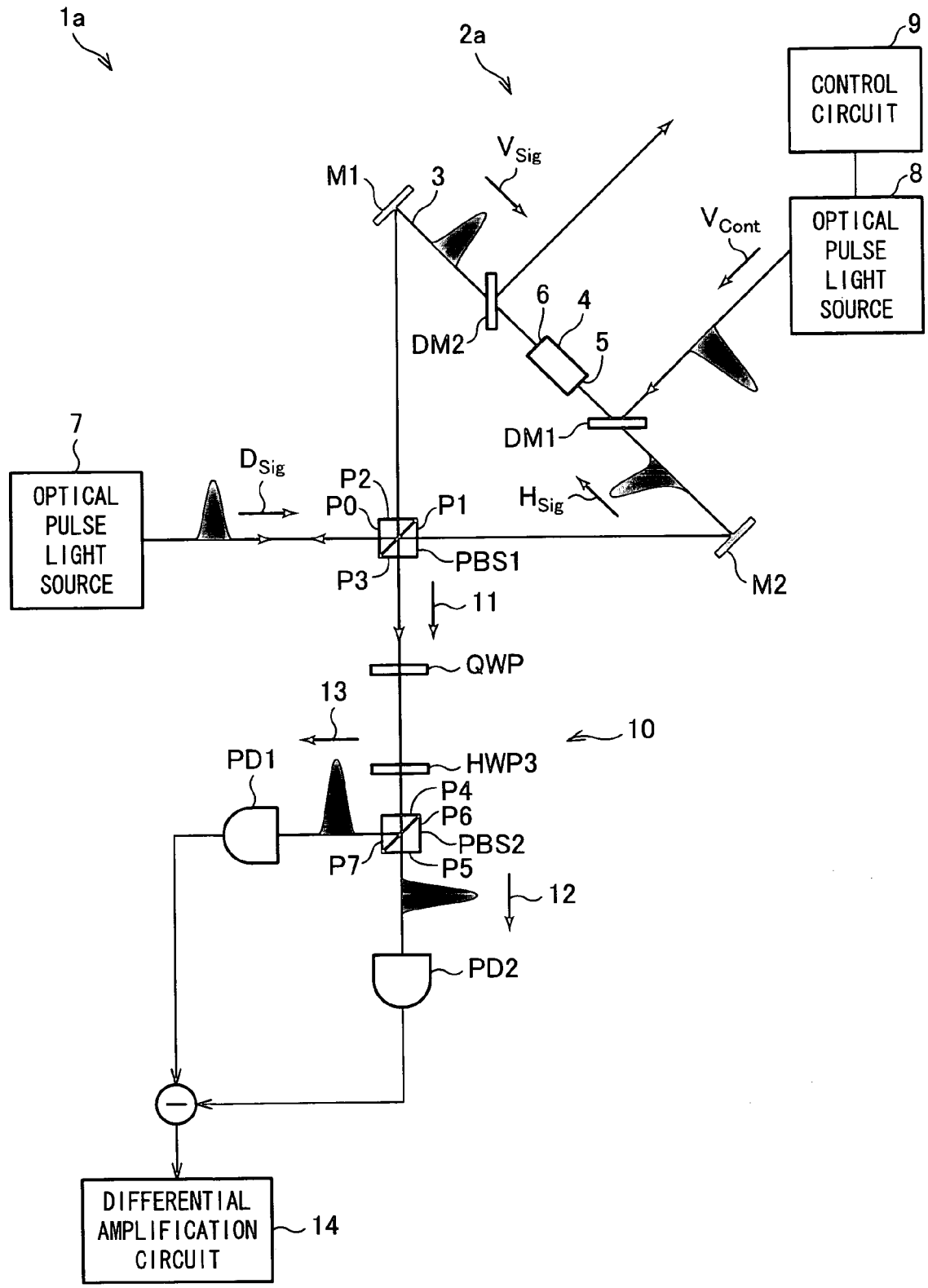
FIG. 4 is a block diagram showing an arrangement of an optical nonlinear evaluation device according to Embodiment 2.

FIG. 4 is a block diagram showing an arrangement of an optical nonlinear evaluation device 1a according to Embodiment 2. Those components identical to the aforementioned components are given the identical reference numerals, and will not be fully described below.

In Embodiment 2, the control beam Vcont and the signal beam Hsig have different wavelengths. Since the optical nonlinear evaluation device 1a according to Embodiment 2 distinguishes between the control beam Vcont and the signal beam Hsig by wavelength, the control beam Vcont may be polarized in any direction.

The optical nonlinear evaluation device 1a includes a polarization Sagnac interferometer 2a. The polarization Sagnac interferometer 2a has a dichroic mirror DM1 provided between the Kerr medium 4 and the mirror M2. The dichroic mirror DM1 completely transmits the signal beam Hsig and completely reflects the control beam Vcont supplied from the optical pulse light source 8, thereby coaxially superimposing the control beam Vcont onto the signal beam Hsig.

The polarization Sagnac interferometer 2a has a dichroic mirror DM2 provided between the Kerr medium 4 and the mirror M1. The dichroic mirror DM2 completely reflects the control beam Vcont and completely transmits the signal beam Hsig, thereby separating the control beam Vcont from the signal beam Hsig.

Thus, in the optical nonlinear evaluation device 1a according to Embodiment 2, the dichroic mirror DM1 coaxially superimposes the control beam Vcont onto the signal beam Hsig by completely transmitting the signal beam Hsig and completely reflecting the control beam Vcont supplied from the optical pulse light source 8, and supplies the superimposed beams to the Kerr medium 4. Therefore, if there is no loss in the Kerr medium 4, there is no theoretical loss in the system itself.

Further, the dichroic mirror DM2 separates the control beam Vcont from the signal beam Hsig by completely reflecting the control beam Vcont and completely transmitting the signal beam Hsig. Therefore, the control beam Vcont can be separated and extracted from the signal beam Hsig after the beams have been transmitted by the Kerr medium 4. This enables the optical nonlinear evaluation device 1a of Embodiment 2 to function as a two-input and two-output switching element.

An optical switching element that is applied to quantum information processing technology typified by a quantum computer having recently received attention is required to function by using single photons as a signal beam and a control beam. Furthermore, it is necessary to extract the control photon and the signal photon after they have traveled through a Kerr medium. That is, it is necessary that there is no theoretical loss in the element itself. This necessitates a lossless two-input and two-output switching element.

The optical nonlinear evaluation device 1a of Embodiment 2 has no theoretical loss in the system itself, and can function as a two-input and two-output switching element. Therefore, the optical nonlinear evaluation device 1a of Embodiment 2 can constitute an optical switching element that performs high-speed switching for the purpose of quantum information processing.

EMBODIMENT 3

Figure 5:
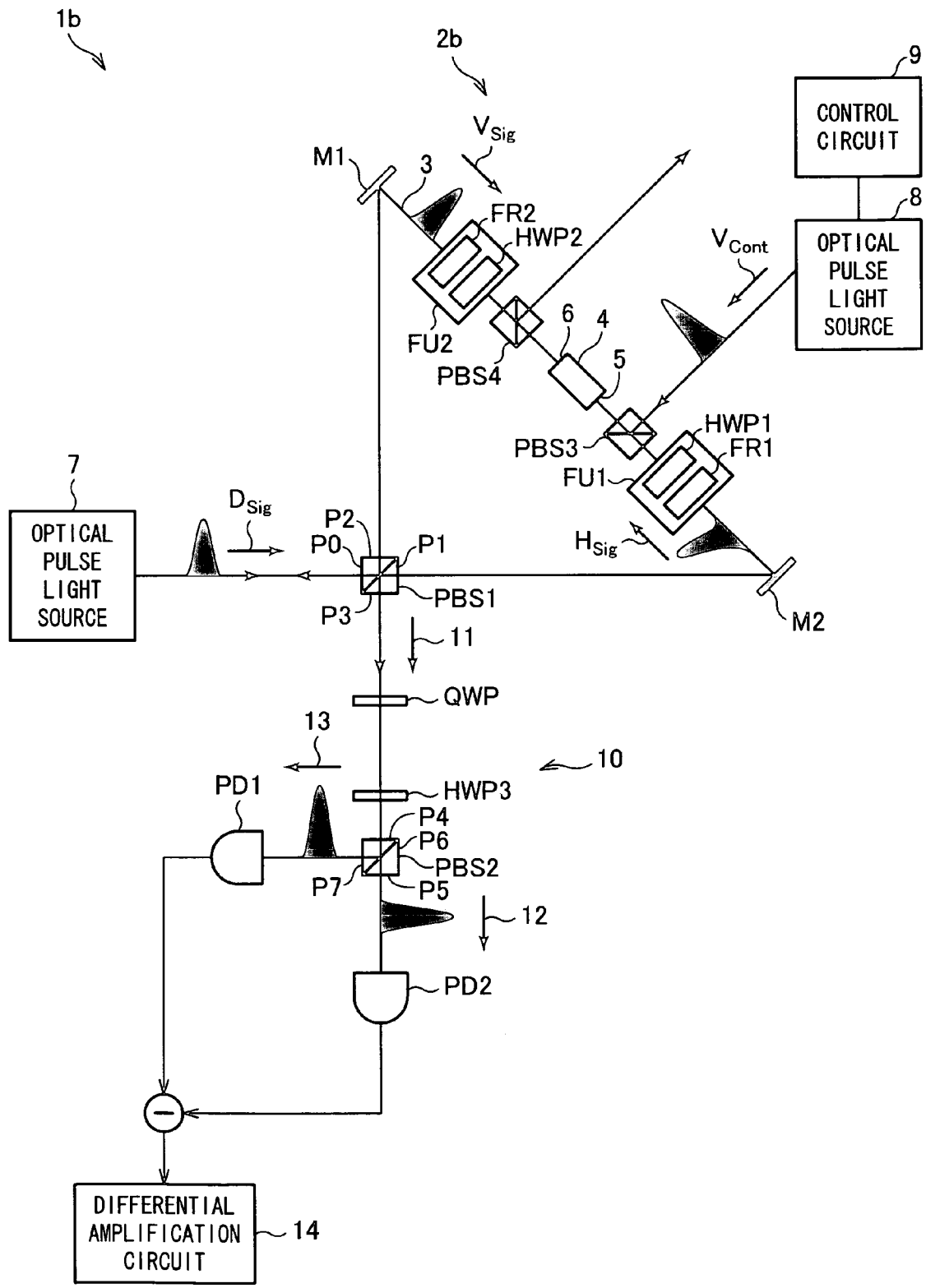
FIG. 5 is a block diagram showing an arrangement of an optical nonlinear evaluation device according to Embodiment 3.

FIG. 5 is a block diagram showing an arrangement of an optical nonlinear evaluation device 1b according to Embodiment 3. Those components identical to the aforementioned components are given the identical reference numerals, and will not be fully described below.

In Embodiment 3, the control beam Vcont and the signal beam Hsig are polarized in directions that differ by 90 degrees from each other. The control beam Vcont and the signal beam Hsig may have identical wavelengths.

The optical nonlinear evaluation device 1b includes a polarization Sagnac interferometer 2b. The polarization Sagnac interferometer 2b has: a Faraday unit FU1, disposed between the Kerr medium 4 and the mirror M2, which has a Faraday rotator FR1 and a half-wave plate HWP1; and a Faraday unit FU2, disposed between the Kerr medium 4 and the mirror M1, which has a Faraday rotator FR2 and a half-wave plate HWP2.

The polarization Sagnac interferometer 2b has: a polarization beam splitter PBS3 provided between the Faraday unit FU1 and the Kerr medium 4; and a polarization beam splitter PBS4 provided between the Faraday unit FU2 and the Kerr medium 4.

A combination of (a) optical elements (Faraday rotators FR1 and FR2) that vary in refractive index with respect to a right-hand circularly-polarized beam and a left-hand circularly-polarized beam and (b) the half-wave plates HWP1 and HWP2 serving as optical elements that rotate linear polarization makes it possible to constitute an element irreversible in terms of polarization. That is, it is possible to constitute such an element that whereas the polarization of a linearly-polarized beam entering the element from one direction is rotated 90 degrees, the polarization is not changed when the linearly-polarized beam enters the element from the opposite direction.

As shown in FIG. 5, the disposition of the Kerr medium 4 between the Faraday units FU1 and FU2 causes the signal beams Hsig and Vsig to pass through the Kerr medium 4 while being in identical states of polarization.

When the signal beam Vsig passes through the Faraday unit FU2 constituted by the Faraday rotator FR2 and the half-wave plate HWP2, the polarization of the signal beam Vsig is rotated 90 degrees (V→H), so that the signal beam Vsig passes through the Kerr medium 4 as a signal beam polarized in a 0-degree direction as with the signal beam Hsig. Then, when the signal beam passes through the Faraday unit FU1 constituted by the Faraday rotator FR1 and the half-wave plate HWP1, the polarization of the signal beam is rotated 90 degrees (H→V), so that the signal beam returns to the signal beam Vsig polarized in a 90-degree direction.

On the other hand, regardless of whether the counterrotating signal beam Hsig passes through the Faraday unit FU1 or the Faraday unit FU2, the polarization of the signal beam Hsig is neither rotated nor changed.

For this reason, when the control beam Vcont that differs by 90 degrees in polarization from the signal beam Hsig is supplied to the polarization beam splitter PBS3 from the optical pulse light source 8, the control beam Vcont thus incident on the polarization beam splitter PBS3 can be completely supplied to the Kerr medium 4. Further, after the control beam Vcont has passed through the Kerr medium 4, the control beam Vcont can be completely separated outwardly by the polarization beam splitter PBS4.

In cases where the control beam Vcont and the signal beam Hsig have identical wavelengths, the two optical pulse light sources 7 and 8 can be replaced by a single optical pulse light source.

Thus, in Embodiment 3, the signal beams Hsig and Vsig pass through the Kerr medium 4 while being in identical states of polarization, and the control beam Vcont incident on the polarization beam splitter PBS3 is completely supplied to the Kerr medium 4. Therefore, there is no theoretical loss in the system itself.

Further, after the control beam Vcont has passed through the Kerr medium 4, the control beam Vcont can be completely separated outwardly by the polarization beam splitter PBS4. Therefore, the optical nonlinear evaluation device 1*b* of Embodiment 3 can function as a two-input and two-output switching element.

Thus, as with the optical nonlinear evaluation device 1*a* of Embodiment 2, the optical nonlinear evaluation device 1*b* of Embodiment 3 has no theoretical loss in the system itself, and can function as a two-input and two-output switching element. Therefore, the optical nonlinear evaluation device 1*b* of Embodiment 3 can constitute an optical switching element that performs high-speed switching for the purpose of quantum information processing.

EMBODIMENT 4

FIG. 6 is a block diagram showing an arrangement of an optical nonlinear evaluation device according to Embodiment 4. Those components identical to the aforementioned components are given the identical reference numerals, and will not be fully described below.

In cases where the Kerr medium 4 has a thin shape like a semiconductor, the control beam Vcont may be made incident on the Kerr medium 4 so that, as shown in FIG. 6, the signal beam Hsig and the control beam Vcont cross each other in the Kerr medium 4. In this case, if the signal beam Hsig, the signal beam Vsig, and the control beam Vcont are incident on the Kerr medium 4 at the same time, the control beam Vcont generates cross-phase modulation in both the signal beams Hsig and Vsig. Therefore, the Kerr medium 4 is disposed in such a place that the signal beam Hsig and the signal beam Vsig do not overlap.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be applied to an optical nonlinear evaluation device and an optical switching element each of which uses a Sagnac interferometer to detect, as polarization information, a phase shift caused by cross-phase modulation generated in a Kerr medium.

The invention claimed is:

1. An optical nonlinear evaluation device comprising:
    a polarization Sagnac interference path provided with a Kerr medium that causes an optical nonlinear effect of causing a change in refractive index in accordance with light intensity;
    an optical pulse light source for supplying the polarization Sagnac interference path with a first signal beam polarized in a first direction;
    a first polarization beam splitter provided on the polarization Sagnac interference path so as to split the first signal beam into, a second signal beam polarized in a second direction and a third signal beam polarized in a third direction orthogonal to the second direction, to supply the second beam to a first side of the Kerr medium, and to supply the third beam to a second side of the Kerr medium;
    superimposing means for coaxially superimposing, onto either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam;
    separating means for separating the control beam from either of the second and third signal beams having traveled through the Kerr medium; and
    detecting means provided so as to detect a phase difference between the second signal beam and the third signal beam.

2. The optical nonlinear evaluation device as set forth in claim 1, wherein:
    the second signal beam and the control beam have different wavelengths;
    the superimposing means is a first dichroic mirror, disposed on the first side of the Kerr medium so as to superimpose the control beam onto the second signal beam, which transmits the second signal beam and reflects the control beam; and
    the separating means is a second dichroic mirror, disposed on the second side of the Kerr medium so as to separate the control beam from the second signal beam, which transmits the second signal beam and reflects the control beam.

3. The optical nonlinear evaluation device as set forth in claim 1, wherein the control beam is polarized in a direction orthogonal to the direction in which the second signal beam is polarized, the optical nonlinear evaluation device further comprising:
a first Faraday unit, disposed on the first side of the Kerr medium, which has a first Faraday rotator and a first half-wave plate; and
a second Faraday unit, disposed on the second side of the Kerr medium, which has a second Faraday rotator and a second half-wave plate,
the superimposing means being a third polarization beam splitter so disposed between the first Faraday unit and the Kerr medium as to superimpose the control beam onto the second signal beam,
the separating means being a fourth polarization beam splitter so disposed between the second Faraday unit and the Kerr medium as to separate the control beam from the second signal beam.

4. The optical nonlinear evaluation device as set forth in claim 1, wherein the control beam and the first signal beam have equal wavelengths.

5. The optical nonlinear evaluation device as set forth in claim 1, wherein:
the superimposing means is a glass plate so disposed on the first side of the Kerr medium as to superimpose the control beam onto the second signal beam; and
the separating mean is the first polarization beam splitter that separates the control beam from the second signal beam.

6. The optical nonlinear evaluation device as set forth in claim 1, wherein the Kerr medium is constituted by an optical fiber.

7. The optical nonlinear evaluation device as set forth in claim 1, wherein:
the first polarization beam splitter combines, into a fourth signal beam, the second and third signal beams having traveled through the Kerr medium; and
the detecting means includes:
a quarter-wave plate for converting the fourth signal into a linearly-polarized beam;
a half-wave plate for rotating a polarization angle of the linearly-polarized beam; and
a second polarization beam splitter for splitting the linearly-polarized beam, having traveled through the half-wave plate, into a fifth signal beam and a sixth signal beam in accordance with the polarization angle of the linearly-polarized beam.

8. The optical nonlinear evaluation device as set forth in claim 1, wherein the first direction is a plus-45-degree direction.

9. An optical switching element comprising:
a polarization Sagnac interference path provided with a Kerr medium that causes an optical nonlinear effect of causing a change in refractive index in accordance with light intensity;
a first optical pulse light source for supplying the polarization Sagnac interference path with a first signal beam polarized in a first direction;
a first polarization beam splitter provided on the polarization Sagnac interference path so as to split the first signal beam into a second signal beam polarized in a second direction and a third signal beam polarized in a third direction orthogonal to the second direction, to supply the second beam to a first side of the Kerr medium, and to supply the third beam to a second side of the Kerr medium;
a second optical pulse light source for supplying, to either of the second signal beam traveling from the first polarization beam splitter to the first side of the Kerr medium and the third signal beam traveling from the first polarization beam splitter to the second side of the Kerr medium, a control beam that differs in optical characteristic from either of the second signal beam and the third signal beam, so as to cause a 180-degree phase difference between the second signal beam and the third signal beam by cross-phase modulation generated in the Kerr medium;
superimposing means for coaxially superimposing, onto either of the second signal beam and the third signal beam, the control beam supplied from the second optical pulse light source;
separating means for separating the control beam from either of the second and third signal beams having traveled through the Kerr medium; and
control means for controlling whether or not the control beam is supplied from the second optical pulse light source,
the first polarization beam splitter combining, into a fourth signal beam, the second and third signal beams having traveled through the Kerr medium,
the optical switching element further comprising:
a quarter-wave plate for converting the fourth signal into a linearly-polarized beam;
a half-wave plate for rotating a polarization angle of the linearly-polarized beam; and
a second polarization beam splitter for emitting the linearly-polarized beam, having traveled through the half-wave plate, to different ports in accordance with whether or not the control means allows the control beam to be supplied.

* * * * *

UNITED STATES PATENT AND TRADEMARK OFFICE
CERTIFICATE OF CORRECTION

PATENT NO. : 7,652,770 B2  
APPLICATION NO. : 11/990627  
DATED : January 26, 2010  
INVENTOR(S) : Keiichi Edamatsu, Ryosuke Shimizu and Nobuyuki Matsuda It is certified that error appears in the above-identified patent and that said Letters Patent is hereby corrected as shown below:

On the title page item (54) and col. 1, line 1, should read:  
OPTICAL NONLINEAR EVALUATION DEVICE AND OPTICAL SWITCHING ELEMENT Signed and Sealed this Sixth Day of July, 2010

David J. Kappos  
*Director of the United States Patent and Trademark Office*